(12) United States Patent
Suginuma

(10) Patent No.: US 6,816,841 B1
(45) Date of Patent: Nov. 9, 2004

(54) PROGRAM PROVIDING APPARATUS AND METHOD, PROGRAM RECEIVING APPARATUS AND METHOD

(75) Inventor: Koji Suginuma, Tokyo (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 09/650,154

(22) Filed: Aug. 29, 2000

(30) Foreign Application Priority Data

Aug. 31, 1999 (JP) ......................................... P11-246478

(51) Int. Cl.[7] ............................................. G06F 17/60
(52) U.S. Cl. .............................. 705/52; 705/37; 705/1; 705/30; 705/87; 705/90; 705/104; 705/60
(58) Field of Search ................. 703/52, 37; 725/87–90, 725/104, 60; 705/30, 37, 52

(56) References Cited

FOREIGN PATENT DOCUMENTS

EP         1176491 A2 *  1/2002  ............. G06F/1/00

OTHER PUBLICATIONS

Solomon Barry, Gibbons Rachel, Coming to term with new billin methods, Nov. 1992, National Law Journal, v15, n12, Mon ed. col. 1.*

* cited by examiner

Primary Examiner—James P. Trammell
Assistant Examiner—Firmin Backer
(74) Attorney, Agent, or Firm—Jay H. Maioli

(57) ABSTRACT

A method and apparatus for providing pay programs to viewers, distributes program guide information representing the program subject which will be broadcast receives subscription information from a person who has received the distributed program guide information and wishes to subscribe to the program, charges a subscription charge to a person who wishes to subscribe on the basis of the subscription information, and distributes the program as a broadcast signal, which is produced or purchased by using the subscription charge that has been collected at the step of charging, so that it is possible to provide only programs that meet the viewer's demands.

8 Claims, 2 Drawing Sheets

PROGRAM PROVIDING APPARATUS AND METHOD, PROGRAM RECEIVING APPARATUS AND METHOD

BACKGROUND OF THE INVENTION

1. Field of the Invention

This invention relates to a program providing apparatus and its method and a program receiving apparatus and its method, and more particularly, is suitably applied to a program providing system for providing pay programs to the viewers.

2. Description of the Related Art

Recently, the program providing system which distributes various programs to viewers through, for example, a communication satellite and cables has been realized. The broadcaster obtains self-chosen programs comprising various contents and respectively allocates each program to the set time zone so as to broadcast it.

In a case that a viewer selects the pay-per-view program (pay for each program) among a plurality of programs distributed in this way by using a receiver to view it, the viewing record of the pay-per-view program is uploaded to the upper accounting organ by a modem built in the receiver.

However, since the pay-per-view program is a program having the subject that the broadcaster has prefigured the number of viewers for themselves and obtained it, the actual viewers are extremely few. Thereby, when the payment of broadcasting rights is higher than the amount of money collected from the viewers, the broadcaster may suffer big losses.

The mechanism is not proposed yet such that the broadcaster receives applications for viewing by sign-on after the subject of program is obtained. It has been quite difficult that the number of people who applies for viewing of the program is previously measured before sign-on in order to determine whether or not the broadcaster actually broadcasts the program.

SUMMARY OF THE INVENTION

In view of the foregoing, an object of this invention is to provide a program providing apparatus and its method and a program receiving apparatus and its method which can establish a smooth and unwasted program supply route.

The foregoing object and other objects of the invention have been achieved by the provision of a program providing apparatus comprising: distributing means for distributing program guide information representing the program subject which will be broadcasted; subscription receiving part for receiving subscription information from a person who has received the distributed program guide information and wishes to subscribe the program; and charging means for charging a person who wishes to subscribe for a subscription charge on the basis of the subscription information; wherein the distributing means, using the subscription charge collected by the charging means, produces or purchases the program and distributes the program as a broadcast signal.

As a result, the program providing apparatus makes it possible to provide only programs that meet the viewer's demand at all time, and to hardly suffer a loss with few earnings obtained from the viewers in the case that the program is actually broadcasted.

Furthermore, the present invention provides a program providing method comprising the steps of: distributing program guide information representing the program subject which will be broadcasted; receiving subscription information from a person who has received the distributed program guide information and wishes to subscribe the program; and charging a person who wishes to subscribe for a subscription charge on the basis of the subscription information; wherein distributing the program produced or purchased by using the subscription charge collected at the step of charging.

As a result, the program providing method makes it possible to provide only programs that meet the viewer's demand at all time, and to hardly suffer a loss with few earnings obtained from the viewers in the case that the program is actually broadcasted.

Still further, the present invention provides a program receiving apparatus investing in a preferred program comprising: receiving means for receiving program guide information representing the program subject which will be broadcasted by a program providing apparatus; and transmitting means for transmitting subscription information and accounting information to the program providing apparatus when desiring to subscribe the program after having determined whether or not to desire to subscribe the program based on the received program guide information; wherein the receiving means receives the profits at a predetermined rate gained from a viewing charge for the program which is produced or purchased with the charge taken according to the accounting information and distributed by Pay Per View by the program providing apparatus.

As a result, in the program receiving apparatus, the viewers who have invested the subscription charge are not only ensured to subscribe for the program subject, but can obtain the dividend in reward for the amount invested at a subscription. Thereby, the subscription frequency of the program subject by the viewers can be increased.

Further yet, the present invention provides a program receiving method investing in a preferred program, comprising the steps of: receiving program guide information representing the program subject which will be broadcasted by a program providing apparatus; transmitting subscription information and accounting information to the program providing apparatus when desiring to subscribe the program after having determined whether or not to desire to subscribe the program based on the received program guide information; and receiving the profits at a predetermined rate gained from a viewing charge for the program which is produced or purchased with the charge taken according to the accounting information and distributed by Pay Per View by the program providing apparatus.

As a result, in the program receiving method, the viewers who have invested the subscription charge are not only ensured to subscribe for the program subject, but can obtain the dividend in reward for the amount invested at a subscription. Thereby, the subscription frequency of the program subject by the viewers can be increased.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Construction of Program Providing System According to this Embodiment

Figure 1:
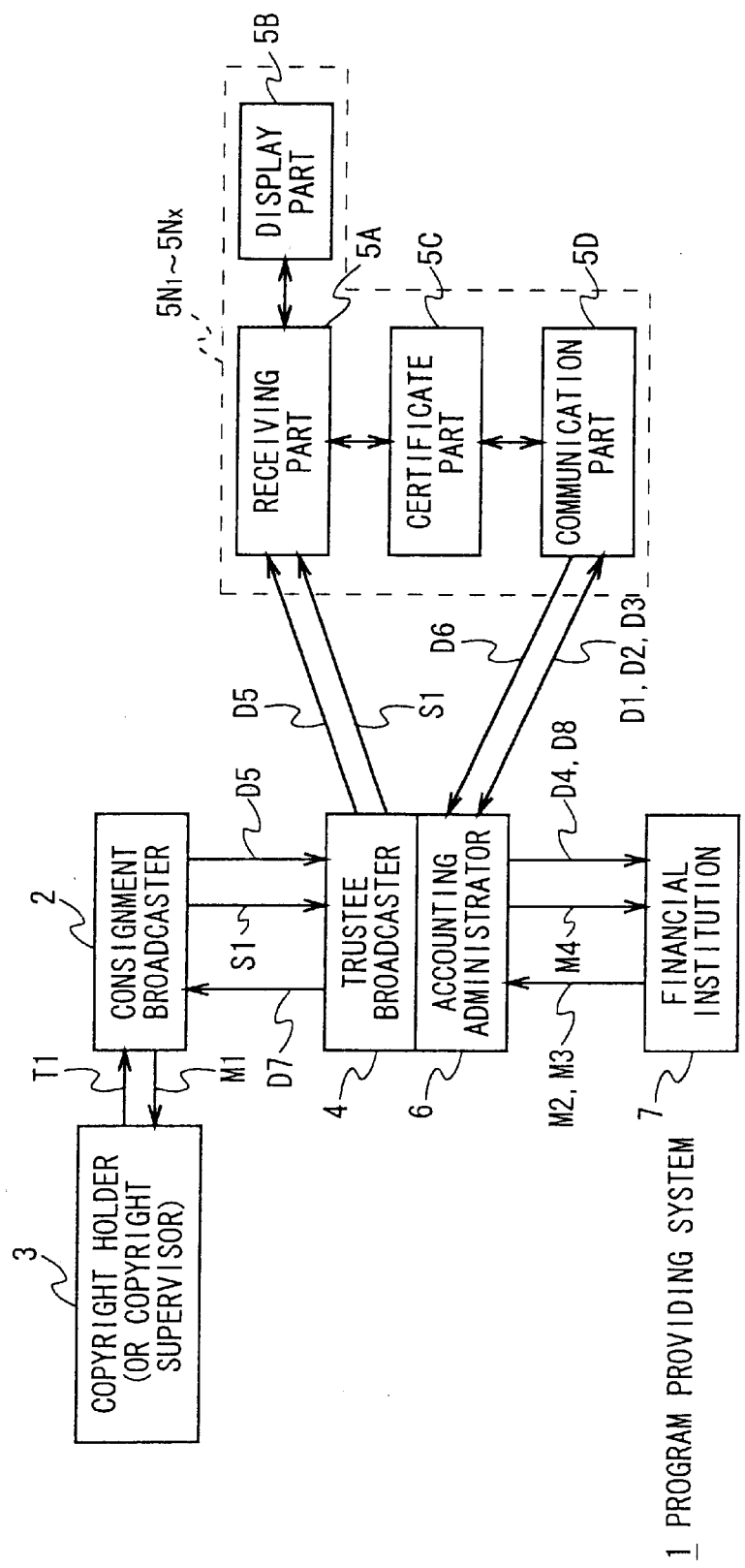
FIG. 1 is a schematic diagram showing the configuration of the program providing system according to this embodiment.

In FIG. 1, 1 entirely shows a program providing system. A consignment broadcaster 2 which edits broadcasting programs pays the corresponding price M1 to copyright holders (or copyright supervisors) 3 in order to gain authorization for using a production T1 as the program subject, and produces programs. Then, a broadcast signal S1 representing each program is distributed to receivers $5N_1$ to $5N_X$ (X: arbitrarily natural number) which are owned by viewers through a communication satellite (not shown) administered by a trustee broadcaster 4.

The receivers $5N_1$ to $5N_X$ receive the broadcast signal S1 transmitted through the communication satellite at a receiving part 5A, and then display by image a plurality of programs based on the broadcast signal S1 on a display part 5B selectively in accordance with the operation by viewers. At this time, if a viewer selects the pay-per-view program (pay for each program) visually checking the display part 5B, a certificate part 5C verifies whether or not the viewer is a broadcast subscriber.

Only when the result of verification in the certificate part 5C is affirmative, a communication part 5D sends viewing-demand information D1 of the pay-per-view program selected by the viewer to an accounting administrator 6 through a telephone line and so on (not shown) for example, together with identification information D2 representing that the viewer is a broadcast subscriber which is given from the certificate part 5C.

On the basis of the viewing-demand information D1 and the identification information D2 given from the communication part 5D in the receivers $5N_1$ to $5N_X$ through the telephone line, etc., the accounting administrator 6 confirms the identification information D2 by checking it with the record in own database. Then, the accounting administrator 6 sends, to the communication part 5D in the receivers $5N_1$ to $5N_X$, through the communication satellite controlled by the trustee broadcaster 4, decipher information D3 which is necessary to decipher the scrambled pay-per-view program selected by the viewer, and at the same time, sends to a financial institution 7 accounting information D4 representing viewing rate which is assigned to the pay-per-view program selected by the viewer.

Thereby, the viewer displays the images of the pay-per-view program based on the broadcast signal S1 received through the receiving part 5A on the display part 5B, based on the decipher information D3 supplied to the communication part 5D in the receivers $5N_1$ to $5N_X$, and at the same time, sends a sound of the pay-per-view program through a speaker which is not shown in figure.

On the other hand, the financial institution 7 charges for the amount corresponding to the viewing rate of the pay-per-view program from the viewer's designated account, based on the accounting information D4 given from the accounting administrator 6, thereafter, supplies viewing rate M2 corresponding to the amount to the accounting administrator 6.

In addition to the above constitution, in the program providing system 1, before obtaining the production T1 from the copyright holder (or the copyright supervisor) 3, the consignment broadcaster 2 shows a program produced in accordance with the production T1 to collect the person who contracts for sponsorship (hereinafter, referred to as subscriber) among the viewers, and collects the viewing rate from the viewers who have applied for receiving the program being the pay-per-view program at an actual broadcast time (hereinafter, referred to as applicant). Then, the consignment broadcaster 2 gives, to the subscriber, a certain percentage of surplus that the expense necessary for providing a program is subtracted from the total of the viewing rate, in accordance with contract.

In the program providing system 1, the consignment broadcaster 2 successively proposes the desired program subjects which can be produced based on the production T1 which will be obtained in the future, and distributes as program guide information D5 the listed program information (name of program, simple explanation of contents, etc.) on the basis of the program subjects to the receivers $5N_1$ to $5N_X$ which are owned by viewers through the communication satellite (not shown) controlled by the trustee broadcaster 4. The program information contains such as the cast (leading actor or actress), story or director in the case of video in addition to the name of program, simple explanation of contents.

In the receivers $5N_1$ to $5N_X$, the list of the program guide information D5 supplied to the receiving part 5A is displayed on the displaying part 5B. When a viewer selects the program subject which may be viewed in the future among from the displayed list of a plurality of program subjects with visually confirming, the certificate part 5C sends subscription intercommunication information D6 of the program subject to the communication part 5D.

Then, the communication part 5D sends the subscription intercommunication information D6 of the program subject selected by the subscriber to the accounting administrator 6 through the telephone line and so on (not shown), together with the identification information D2 representing that the viewer is a broadcast subscriber which is given from the certificate part 5C.

On the basis of the subscription intercommunication information D6 and the identification information D2 given from the communication part 5D in the receivers $5N_1$ to $5N_X$ through the telephone line, etc., the accounting administrator 6 confirms the identification information D2 by checking it with the record in own database. Then, the accounting administrator 6 sends, to the consignment broadcaster 2, subscription information D7 which has the same contents as the contents based on the subscription intercommunication information D6, and at the same time, sends to the financial institution 7 accounting information D8 representing subscription charge of a desired amount which has been invested for the program subject subscripted by the subscriber.

The financial institution 7 charges for the amount corresponding to the subscription charge of the subscripted program subject from the subscriber's designated account, based on the accounting information D8 given from the accounting administrator 6, thereafter, supplies subscription charge M3 corresponding to the amount to the accounting administrator 6.

The consignment broadcaster 2 determines whether or not the collected subscription charge M3 received from the accounting administrator 6 is enough. Only if an affirmative result is obtained, the consignment broadcaster 2 pays the corresponding price M1 to the copyright holder (or copyright supervisor) 3 who holds the production T1 being the source of the program subject subscripted by the subscriber based on the subscription information D7 received from the accounting administrator 6, so as to obtain the authorization to use the production T1. Then, the consignment broadcaster 2 produces a program based on the production T1.

On the other hand, if the consignment broadcaster 2 obtains a negative result, that is, if the consignment broadcaster 2 cancels the production of the program subject due to the insufficient subscription charge M3 received from the accounting administrator 6, the accounting administrator 6 returns the subscription charge M3 to the corresponding subscribers through the financial institution 7.

After this, the consignment broadcaster 2 transmits the broadcast signal S1 which is obtained by setting a broadcast channel and broadcast time to the program produced in this way (pay-per-view program) to the receivers $5N_1$ to $5N_X$ which are owned by the viewers through the communication satellite controlled by the trustee broadcaster 4.

If any of the viewers who own the receivers $5N_1$ to $5N_X$ selects the pay-per-view program based on the broadcast signal S1 received through the receiving part 5A (that is, if the viewer is an applicant), the certificate part 5C verifies whether or not the applicant is a broadcast reception contractant. The communication part 5D sends the viewing-demand information D1 of the pay-per-view program to the accounting administrator 6 through the telephone line together with the identification information D2 representing that the applicant is a broadcast reception contractant, only when the verified result of the certificate part 5C is an affirmative.

On the basis of the viewing-demand information D1 and the identification information D2 given from the communication part 5D in the receivers $5N_1$ to $5N_X$ through the telephone line, etc., the accounting administrator 6 confirms the identification information D2 by checking it with the record in own database. Then, only if it is confirmed, the accounting administrator 6 sends, to the communication part 5D in the receivers 5N, to $5N_X$ through the communication satellite, decipher information D3 which is necessary to decipher the scrambled pay-per-view program that the applicant applies for viewing, and at the same time, sends to the financial institution 7 accounting information D4 representing viewing rate which is assigned to the pay-per-view program.

At this time, the accounting administrator 6 sends, to the communication part 5D in the receivers $5N_1$ to $5N_X$, which are owned by the subscribers through the telephone line, decipher information D3 which is necessary to decipher the scrambled program that the subscriber has subscribed (that is, pay-per-view program).

Thereby, based on the decipher information D3 supplied to—the communication part 5D in the receivers $5N_1$ to $5N_X$, the subscribers and applicants display the images of the pay-per-view program according to the broadcast signal S1 received through the recording part 5A on the display part 5B, and at the same time, sends a sound of the pay-per-view program through a speaker which is not shown in figure.

Then, the accounting administrator 6 supplies the viewing rate M2 collected from the applicants through the financial institution 7 to the consignment broadcaster 2. If an excess can be obtained after various expense necessary for providing a program (e.g., the price M1 due to the copyright holder (or copyright supervisor) 3, or the commission charges due to the trustee broadcaster 4 and the accounting administrator 6) is subtracted from the viewing rate M2, the consignment broadcaster 2 gives as a dividend M4, to the subscribers through the financial institution 7, the fee in accordance with the contract which is previously determined among from the amount of the excess.

(2) Functions and Effects According to this Embodiment

Figure 2:
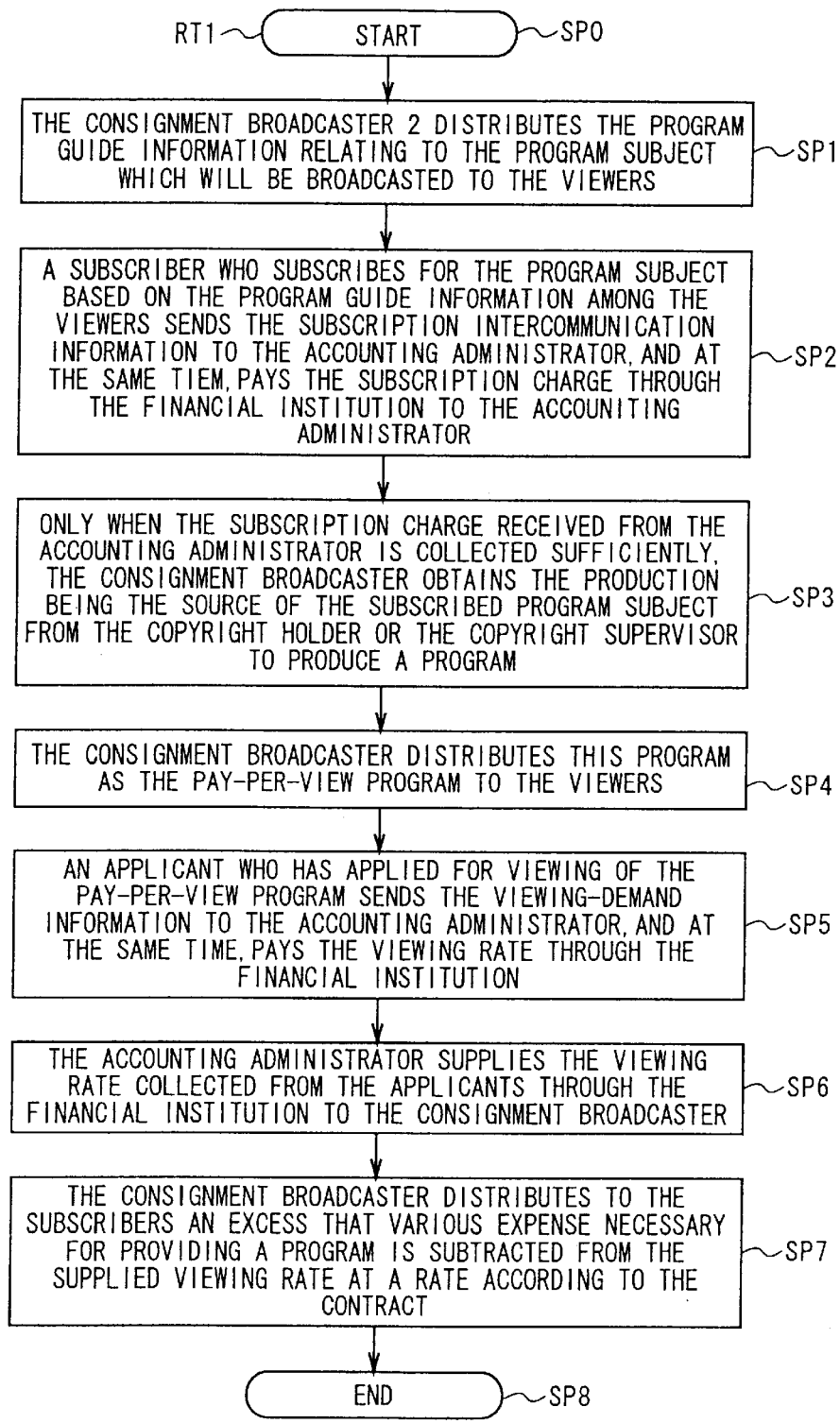
FIG. 2 is a flowchart explaining the program providing procedure according to this embodiment.

According to the configuration described above, in the program providing system 1, the program providing procedure RT1 shown in FIG. 2 starts from step SP0, and the consignment broadcaster 2 distributes the program guide information D5 relating to the program subject which will be broadcasted to the receivers $5N_1$ to $5N_X$ which are owned by viewers through the communication satellite (not shown) controlled by the trustee broadcaster 4 (step SP1). Then, a subscriber who subscribes for the program subject based on the program guide information D5 among the viewers sends the subscription intercommunication information D6 to the accounting administrator 6, and at the same time, pays the subscription charge M3 of a desired investment amount through the financial institution 7 to the accounting administrator 6 (step SP2).

Only when the subscription charge M3 received from the accounting administrator 6 is collected sufficiently, the consignment broadcaster 2 obtains the production T1 being the source of the program subject subscribed by the subscriber from the copyright holder (or copyright supervisor) 3 to produce a program (step SP3).

After that, the consignment broadcaster 2 distributes this program as the pay-per-view program to the receivers $5N_1$ to $5N_X$ which are owned by the viewers through the communication satellite controlled by the trustee broadcaster 4 in tune with a predetermined broadcast time (step SP4). At this time, an applicant who has applied for viewing of the pay-per-view program sends the viewing-demand information D1 to the accounting administrator 6, and at the same time, pays the specified viewing rate M2 through the financial institution 7 (step SP5).

Then, the accounting administrator 6 supplies the viewing rate M2 collected from the applicants through the financial institution 7 to the consignment broadcaster 2 (step SP6). In this way, the consignment broadcaster 2 distributes to the subscribers an excess that various expense necessary for providing a program is subtracted from the supplied viewing rate M2 at a rate according to the contract as a dividend M4 (step SP7). The processing then proceeds to step SP8 to terminate the program providing procedure RT1.

In this way, before obtaining the production T1 being the source of the program subject which will be broadcasted from the copyright holder (or copyright supervisor) 3, the consignment broadcaster 2 informs to the viewers that the program subject will be broadcasted in the future and collects subscribers. Then, only if subscription charge M3 invested by the subscribers is collected sufficiently, the consignment broadcaster 2 obtains the production T1 from the copyright holder (or copyright supervisor) 3 to produce the program. Thereby, the consignment broadcaster 2 can provide only the program in accordance with the viewer's demand all the time, so as to prevent from suffering a loss due to the miscalculation of the viewing rate M2, when the program is distributed to the viewers as the pay-per-view program.

Also, in the case that the applicants who apply for viewing the pay-per-view program which will be broadcasted is beyond expectation and a large amount of viewing rate M2 can be obtained, the consignment broadcaster 2 distributes to the subscribers an excess that various expense necessary for providing a program is subtracted from the viewing rate M2 at a rate according to the contract as a dividend M4, as well as the subscribers subscribe for the program subject to ensure viewing, the subscribers can obtain the dividend M4 in reward for the amount invested at a subscription.

Further, in the case that the subscription charge M3 invested by subscribers is not sufficient so as to cancel the production of the program subject, the consignment broadcaster 2 returns the subscription charge M3 to the corresponding subscribers through the financial institution 7. Thereby, the subscribers can be prevented from suffering a loss to self, hereby they can invest the subscription charge M3 for a desired program subject positively.

According to the constitution described above, in the program providing system 1, the consignment broadcaster 2 informs the program subject which will be broadcasted to viewers to collect subscribers, and a program is produced by obtaining the production T1 from the copyright holder (or copyright supervisor) 3 using the subscription charge M3 invested by the subscribers as an accounting capital. Thereby, the consignment broadcaster 2 can provide a program in accordance with the viewer's demand, and at the same time, hardly suffer a loss with few earnings in the case that the program is broadcasted as the pay-per-view program. Therefore, the program providing system 1 which can establish the smooth and unwasted program supply route can be realized.

(3) Other Embodiments

The embodiment described above has been dealt with the case where program distributing means for distributing program guide information representing the program subject which will be broadcasted is the consignment broadcaster 2 as a main constitution, and includes the trustee broadcaster 4 and the accounting administrator 6 indirectly. However, this invention is not limited to this, but in short, using as the price the total of the subscription charge M3 on the basis of the subscription intercommunication information D6 and the accounting information D8 which are obtained from subscribers, if the program subject can be produced by obtaining the production T1 being the source of the program subject from the copyright holder (or copyright supervisor) 3, and thereafter this is distributed as a broadcast signal S1, this invention can be widely applied to various other program distributing means.

Further, the embodiment described above has been dealt with the case where as a plurality of receiving means for receiving the broadcast signal S1, the receivers $5N_1$ to $5N_X$ shown in FIG. 1 is applied. However, this invention is not limited to this, but in short, after the program guide information D5 is received respectively, if the subscription intercommunication information D6 and the accounting information D8 (that is, investment information) representing the subscription charge M3 for the program subject can be output only when the program subject is subscribed, this invention can be widely applied to other receiving means being various constitution.

Further, the embodiment described above has been dealt with the case where the program distributing means being the consignment broadcaster 2 as a main composition obtains the production (video audio material) T1 being the source of the program subject from the copyright holder (or copyright supervisor) 3, only when the amount of the subscription charge M3 on the basis of the subscription intercommunication information D6 and the accounting information D8 (i.e., investment information) which are obtained from the receivers (receiving means) $5N_1$ to $5N_X$ is above a predetermined amount. However, this invention is not limited to this, but as a predetermined amount in this time, it is unnecessary that the total of the subscription charge M3 is above the amount which can obtain the production T1, and it can be set considering the expectancy earnings of the viewing rate M2 after broadcast.

Further, the embodiment described above has been dealt with the case where the receivers $5N_1$ to $5N_X$, which have applied for viewing the program subject based on the broadcast signal S1 among a plurality of receivers (receiving means) $5N_1$ to $5N_X$ which have received the broadcast signal S1 outputs the accounting information D4 representing the viewing rate M2 for the program subject, and the program distributing means composed of the consignment broadcaster mainly distributes the total of the viewing rate M2 based on the accounting information D4 obtained from the receivers (receiving means) $5N_1$ to $5N_X$, to the receivers (receiving means) $5N_1$ to $5N_X$ which have output the subscription intercommunication information D6 and the accounting information D8 (i.e., investment information) at a predetermined rate as a dividend M4. However, this invention is not only limited to this, but in addition to the subscribers who own the receiver, the dividend M4 can be given to the copyright holder (or copyright supervisor) in accordance with the previous contract.

Further, the embodiment described above has been dealt with the case where the broadcast signal S1, the program guide information D5, the viewing-demand information D1 and the identification information D2 are sent or received through the communication satellite or the telephone line. However, this invention is not only limited to this, but various other transmission system such as exclusive lines including cables, Internet, and ground waves can be used.

Further, the embodiment described above has been dealt with the case where the program providing system 1 according to this invention is applied to the broadcast service corporate structure of the pay-per-view program shown in FIG. 1. However, this invention is not only limited to this, but if an object is to provide a program providing system which can establish the smooth and unwasted program supply route, this invention can be widely applied to the program providing system composing various other corporate structures.

According to the present invention described as above, there is provided a program providing apparatus comprising: distributing means for distributing program guide information representing the program subject which will be broadcasted; subscription receiving part for receiving subscription information from a person who has received the distributed program guide information and wishes to subscribe the program; and charging means for charging a person who wishes to subscribe for a subscription charge on the basis of the subscription information; wherein the distributing means, using the subscription charge collected by the charging means, produces or purchases the program and distributes the program as a broadcast signal. As a result, the program providing apparatus makes it possible to provide only programs that meet the viewer's demand at all time, and to hardly suffer a loss with few earnings obtained from the viewers in the case that the program is actually broadcasted.

Furthermore, the present invention provides a program providing method comprising the steps of: distributing program guide information representing the program subject which will be broadcasted; receiving subscription information from a person who has received the distributed program guide information and wishes to subscribe the program; and charging a person who wishes to subscribe for a subscription charge on the basis of the subscription information; wherein distributing the program produced or purchased by using the subscription charge collected at the step of charging. As a result, the program providing method makes it possible to provide only programs that meet the viewer's demand at all time, and to hardly suffer a loss with few earnings obtained from the viewers in the case that the program is actually broadcasted.

Still further, the present invention provides a program receiving apparatus investing in a preferred program comprising: receiving means for receiving program guide information representing the program subject which will be broadcasted by a program providing apparatus; and transmitting means for transmitting subscription information and accounting information to the program providing apparatus when desiring to subscribe the program after having determined whether or not to desire to subscribe the program based on the received program guide information; wherein the receiving means receives the profits at a predetermined rate gained from a viewing charge for the program which is produced or purchased with the charge taken according to the accounting information and distributed by Pay Per View by the program providing apparatus. As a result, in the program receiving apparatus, the viewers who have invested the subscription charge are not only ensured to subscribe for the program subject, but can obtain the dividend in reward for the amount invested at a subscription. Thereby, the subscription frequency of the program subject by the viewers can be increased.

Further yet, the present invention provides a program receiving method investing in a preferred program comprising the steps of: receiving program guide information representing the program subject which will be broadcasted by a program providing apparatus; transmitting subscription information and accounting information to the program providing apparatus when desiring to subscribe the program after having determined whether or not to desire to subscribe the program based on the received program guide information; and receiving the profits at a predetermined rate gained from a viewing charge for the program which is produced or purchased with the charge taken according to the accounting information and distributed by Pay Per View by the program providing apparatus. As a result, in the program receiving method, the viewers who have invested the subscription charge are not only ensured to subscribe for the program subject, but can obtain the dividend in reward for the amount invested at a subscription. Thereby, the subscription frequency of the program subject by the viewers can be increased.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A program providing apparatus comprising:

distributing means for distributing program guide information representing a subject of a program to be subsequently broadcast;

subscription receiving means for receiving subscription information from a user who has received distributed program guide information and wishes to subscribe to said program; and charging means for charging a subscription charge to a user who wishes to subscribe to said program based on said subscription information and for collecting a fee from each user who wishes to subscribe, wherein said distributing means, using said subscription charge collected by said charging means, obtains said program and distributes said program as a broadcast signal, and wherein when a total of all fees collected from all users is less than a predetermined amount, said program is not distributed as a broadcast signal and the fee is returned to each respective user.

2. The program providing apparatus according to claim 1, wherein said distributing means shares profits of a viewing charge taken for said program at a predetermined rate among users that have subscribed to said program.

3. The program providing apparatus according to claim 1, wherein said distributing means distributes said program by Pay Per View; and said charging means charges a viewing charge to a user who has viewed said program.

4. A program providing method comprising the steps of:

distributing program guide information representing a subject to be subsequently broadcast;

receiving subscription information from a user who has received said program guide information and wishes to subscribe to said program;

charging a subscription charge to a user who wishes to subscribe to said program based on said subscription information and for collecting a fee from each user who wishes to subscribe; and distributing said program obtained by using said subscription charge collected at said step of charging, wherein when a total of all fees collected from all users is less than a predetermined amount, said program is not distributed as a broadcast signal and the fee is returned to each respective user.

5. The program providing method according to claim 4 further comprising the step of:

charging a user a viewing charge who has viewed said program distributed by Pay Per View at said step of distributing said program.

6. The program providing method according to claim 5 further comprising the step of:

sharing profits of a viewing charge collected at said step of charging at a predetermined rate among users who have subscribed to said program.

7. A program receiving apparatus for investing in a preferred program, said apparatus comprising:

receiving means for receiving program guide information representing a subject of a program to be subsequently broadcast by a program providing apparatus; and transmitting means for transmitting subscription information and accounting information to said program providing apparatus when a user desires to subscribe to said program after the user has determined whether to subscribe to said program based on said received program guide information and said accounting information includes an authorization to said program providing apparatus to obtain a fee from the user's account in a financial institution, wherein said program providing apparatus receives profits at a predetermined rate gained from a viewing charge from each user using the program receiving apparatus for said program which is obtained with the viewing charge taken according to said accounting information and distributed by Pay Per View by said program providing apparatus; and wherein when the total of all fees collected from all the users is less than a predetermined amount, said program is not distributed as a broadcast signal and the fee is returned to each respected user.

8. A program receiving method for investing in a preferred program, said method comprising the steps of:

receiving program guide information representing a subject of a program to be subsequently broadcast by a program providing apparatus;

transmitting subscription information and accounting information from a user to said program providing apparatus when desiring to subscribe to said program after having determined whether to subscribe to said program based on said program guide information and said accounting information includes an authorization to said program providing apparatus to obtain a fee from the user's account in a financial institution; and receiving profits at said program providing apparatus at a predetermined rate gained from a viewing charge from each user for said program which is obtained according to said accounting information and distributed by Pay Per View by said program providing apparatus; and wherein when the total of all fees collected from all the users is less than a predetermined amount, said program is not distributed as a broadcast signal and the fee is returned to each respected user.

* * * * *